United States Patent
Celovsky

[15] 3,660,628
[45] May 2, 1972

[54] ELECTRIC ARC MACHINING APPARATUS FOR MANUFACTURING DIES AND ROLLS

[72] Inventor: Michael E. Celovsky, Bloomfield Hills, Mich.

[73] Assignee: Industrial Tool Engineering Company, Detroit, Mich.

[22] Filed: Sept. 18, 1969

[21] Appl. No.: 859,123

[52] U.S. Cl. ............................................219/69 V, 74/353
[51] Int. Cl. .......................................................B23p 1/12
[58] Field of Search ...................219/69 M, 69 V, 69; 74/352, 74/353

[56] References Cited

UNITED STATES PATENTS

| | | | |
|---|---|---|---|
| 2,907,221 | 10/1959 | Haupt | 74/352 |
| 2,974,216 | 3/1961 | Inoue | 219/69 V |
| 3,014,628 | 12/1961 | Littlehale | 74/353 UX |
| 3,149,219 | 9/1964 | Celovsky | 219/69 V |
| 3,288,699 | 11/1966 | Trager et al. | 219/69 M X |

Primary Examiner—R. F. Staubly
Attorney—Hill, Sherman, Meroni, Gross & Simpson

[57] ABSTRACT

An apparatus for electric arc machining grooves in a pair of rolls spaced in side-by-side relationship. The rolls are mounted in the machine to have their axes generally parallel. Adjacent rolls are rotated as an electrode is moved therebetween to form grooves in the circumferential surfaces thereof. Shafts which support the rolls are movable toward or away from each other to accommodate larger or smaller rolls on the machine. A transmission is driven directly from one of the movable shafts. The transmission through a gear rack arrangement moves the electrodes vertically between the rolls. By means of the transmission, the speed of movement of the electrode can be varied to accommodate different diameter rolls. The lateral movement between the rolls with respect to the fixed transmission is accommodated by means of a parallel displacement coupling which couples the transmission to the associated roll supporting shaft.

13 Claims, 13 Drawing Figures

INVENTOR.
MICHAEL E. CELOVSKY

ATTORNEYS 3,660,628

ELECTRIC ARC MACHINING APPARATUS FOR MANUFACTURING DIES AND ROLLS

BACKGROUND OF THE INVENTION

1. Field of the Invention

The field of art to which this invention pertains is apparatus for forming grooves in the surface of rolls and in particular to apparatus for electric arm machining the grooves.

2. Description of the Prior Art

Roll forming machines have generally employed a pair of rolls which rotate together in side-by-side relationship and an electrode which moves linearly between the rolls to form grooves in the circumference of the rolls. However, when it was desired to form different diameter rolls on the same machine, it was required to physically change the gearing between the gear drive for the rolls and the gear drive for the electrode. Since it is important that the speed of the electrode be related to the rotation of the rolls, a change of gearing between the rolls and the electrode drive is required for different diameter rolls. However, since different diameter rolls required movement of the associated driving shafts laterally with respect to one another a number of adjustments were required to properly position the gear train to drive the electrode for various diameter rolls.

SUMMARY OF THE INVENTION

It is an important feature of the present invention to provide an improved method and apparatus for electric arc machining grooves in a pair of rolls.

It is another feature of the present invention to provide a method and apparatus for electric arc machining grooves in a pair of rolls and for accommodating different diameter rolls on the machine without the need to replace gears between the drive for the rolls and the drive for the electric arc machining electrode.

It is also an object of the present invention to provide a method and apparatus for machining grooves in a pair of rolls wherein a gear and linkage drive is provided between the rolls to permit the rolls to be moved toward or away from each other to accommodate different diameter rolls on the machine.

It is another object of the present invention to provide a roll forming device as described above including a method and apparatus for machining side relief in the roll grooves.

It is a further object of the present invention to provide a method and apparatus for machining side relief in grooves formed in rolls and for automatically controlling the movement of the rolls toward the electrode for regulating the degree of side relief.

It is also an object of the present invention to provide a templet and tracer valve to accomplish the above described side relief method and apparatus.

It is an important object of the present invention to provide a transmission for an electric arc machining apparatus to effect a desired speed change between the angular speed of the rolls and the linear speed of the electrode.

It is another object of the present invention to provide a transmission for an electric arc machining apparatus of the type described above wherein the transmission is driven from one of the rolls and wherein the rolls are movable laterally with respect to the transmission.

It is also an object of the present invention to provide an electric arc machining apparatus having a transmission coupled to one of the roll driving gears and employing a parallel displacement coupling between the transmission and the associated roll driving gear to accommodate lateral movement of the roll shaft for various diameter rolls.

It is another object of the present invention to provide a transmission for an electric arc machining device of the type described above wherein the transmission comprises a cone of gears and a coupling gear meshed between one of the gears of the cone of gears and a spline shaft which is used to drive the electric arc machining electrode linearly between the rolls.

It is a further object of the present invention to provide a transmission as described above wherein the coupling gear may be moved transversely of the cone of gears as well as longitudinally thereof so as to be positioned in engagement with any one of the gears of the transmission to provide the required ratio between the angular speed of the rolls and the linear speed of the machining electrode.

It is another object of the present invention to provide a transmission for a machine as described above wherein the longitudinal movement of the coupling gear is accomplished by means of a sleeve mounted about the spline shaft wherein the sleeve has a rack-like gear formed at the outer surface thereof which is engaged by a pinion to move the sleeve and the coupling gear longitudinally relative to the transmission cone of gears.

These and other objects, features and advantages of the present invention will be understood in greater detail from the following description and the associated drawings wherein reference numerals are utilized to designate an illustrative embodiment.

DESCRIPTION OF THE PREFERRED EMBODIMENT

The present invention provides an apparatus and method for supporting a pair of rolls in side-by-side relationship and for moving an electrode vertically between the rolls to electric arc machine grooves in the rolls. The apparatus can accommodate various diameter rolls in that the shafts which support the rolls may be moved laterally with respect to one another.

The shaft which supports one of the rolls, even through it is movable laterally, is used to drive a transmission which in turn drives the electrode in its vertical path between the rolls. The lateral movement of the roll is accommodated through the shaft by means of a parallel displacement coupling. Parallel displacement couplings are well known in the art, and essentially allow end portions of a shaft to be displaced with respect to each other while remaining parallel and permitting continuous drive through the shaft.

The lateral movement between the two rolls is accomplished by means of a set of gears and linkage arrangement which permits continuous drive between the rolls even though the rolls are relatively movable.

Also, a groove side relief apparatus and method is provided which automatically regulates the degree of penetration of an oversized electrode into a groove in a roll to develop a predetermined relief at the outer edge of the groove for excess material during a pipe reducing operation or the like.

Figure 1:
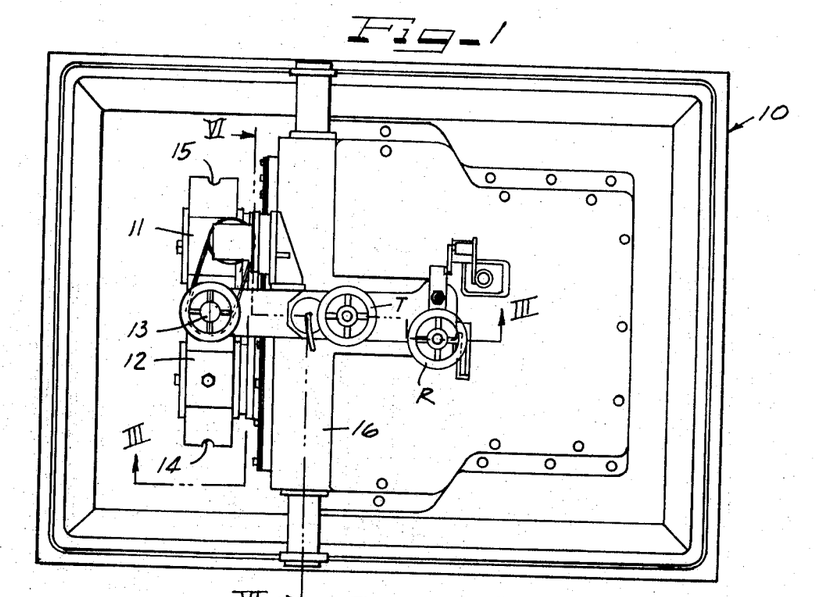
FIG. 1 is a top elevational view of an electric arc machining apparatus according to the present invention.

Referring in detail to the drawings, an apparatus 10 according to the present invention is shown generally in FIG. 1. A pair of rolls 11 and 12 are supported in side-by-side relationship on the machine 10 and an electrode 13 is mounted between the rolls to machine grooves such as the grooves 14 and 15 in the circumference of the rolls.

Figure 6:
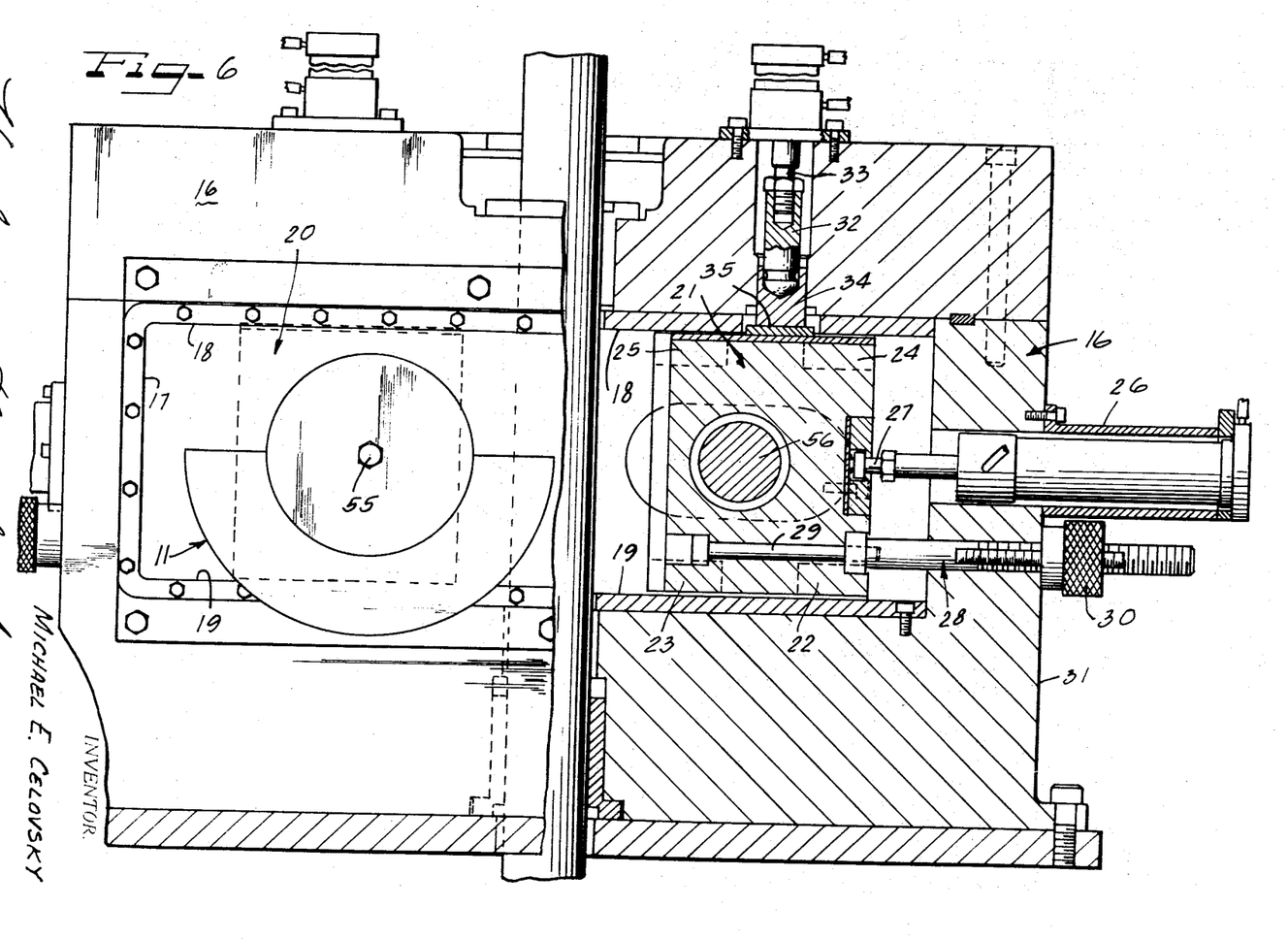
FIG. 6 is a sectional view taken along the lines VI—VI of FIG. 1 and showing the positioning of the blocks which support the rolls in side-by-side relationship and illustrating means for locking the blocks in position once the desired spacing is achieved.

The rolls 11 and 12 are supported on a frame 16 which is shown in more detail in FIG. 6. The frame 16 has a window 17 formed therein which has tracks 18 and 19 to support bearing blocks 20 and 21. The bearing blocks 20 and 21 carry the shafts which support the rolls such as the roll 11 in FIG. 6.

The bearing blocks such as the block 21 has bearing plates 22, 23, 24 and 25 which support the blocks against the tracks 18 and 19. As shown in FIG. 6, the blocks 20 and 21 may be moved laterally with respect to one another along the tracks 18 and 19. In this way, larger or smaller diameter rolls can be accommodated on the machine.

The movement of the blocks 20 and 21 is assisted by means of hydraulic cylinders such as the cylinders 26. The cylinder 26 is mounted at the frame 16 and has a piston 27 which is coupled to the bearing block 21. A gauge 28 is also coupled to the bearing block as at 29 and has a thread nut gauge stop 30 which may be turned to any desired lateral positioning for the block 21. When the gauge stop 30 is adjusted to the desired setting, the hydraulic motor or cylinder is then actuated to drive the piston 27 to the left until the gauge stop 30 strikes the wall 31 of the frame 16. When this occurs, the bearing block 21 and hence the associated roll is in the desired position, and a hydraulic clamp 32 may then be used to lock the block in place. Hydraulic pressure in a line 33 exerts pressure on a piston 34 which has a brake shoe 35 attached thereto. The brake shoe then engages the bearing block 21 and locks the block and roll assembly in position.

Figure 3:
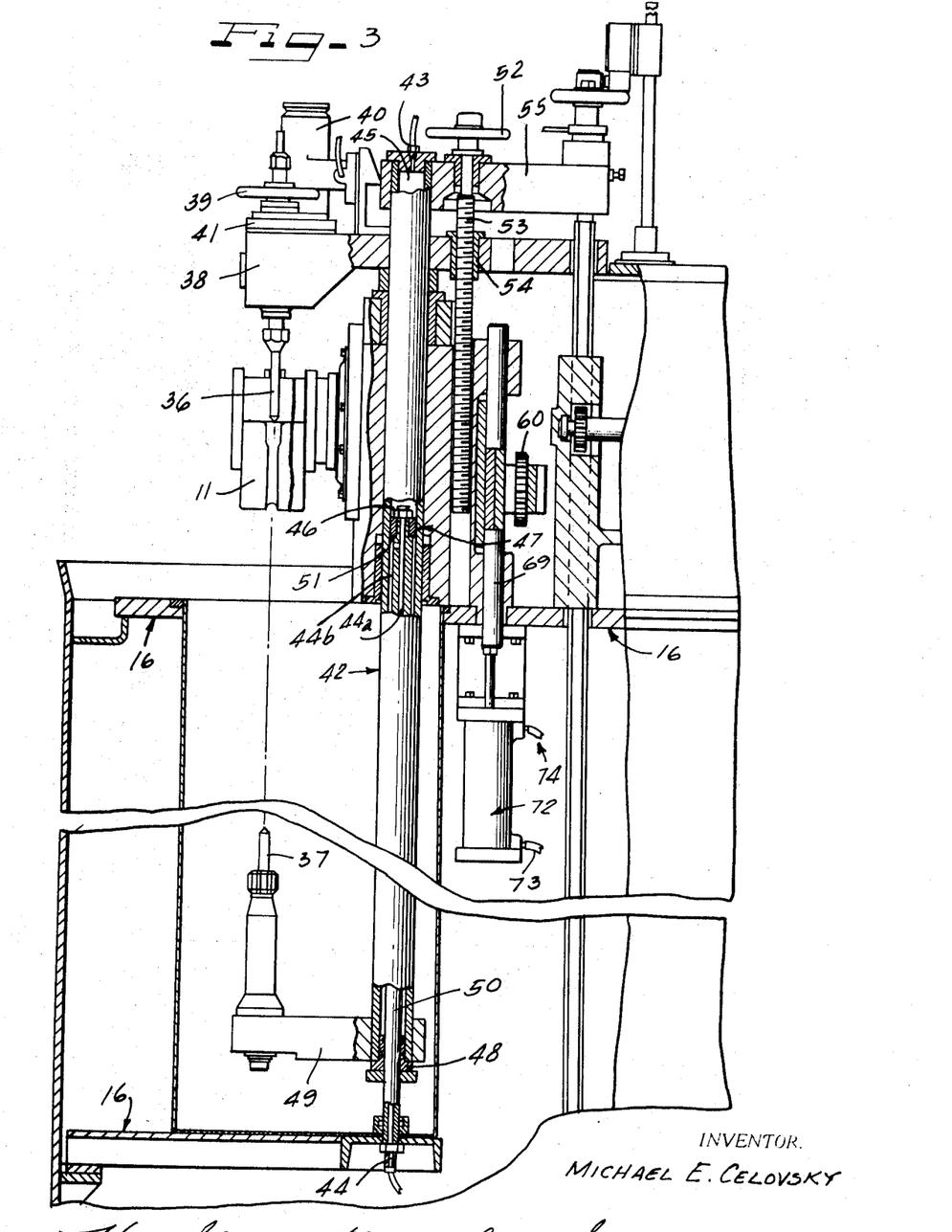
FIG. 3 is a sectional view taken along the lines III—III of FIG. 1 showing means for varying the vertical positioning of the upper and lower electrode center supports.

The electrode which is used to arc machine the grooves in the rolls 11 and 12 is supported on upper and lower centers 36 and 37 respectively in FIG. 3. The upper center 36 is supported at an upper head 38. A hand turned wheel 39 may be used to adjust the position of the upper center 36, and an electric motor 40 may also be used through a drive belt 41 to adjust the vertical positioning of the upper center 36.

The lower center 37 may be moved vertically by means of a hydraulic cylinder and piston arrangement 42.

Oil enters the fitting 43 and exerts a pressure within the chamber 45 against the surface 46 of the piston 47. This pressure has the effect of lifting the assembly 55 upwardly. The sleeve 42 of the piston assembly is directly coupled to the arm 49 of the lower center 37, and accordingly the lower center 37 moves upwardly with the assembly 55.

In reverse, oil enters the fitting 44 and travels through a hollow center 44a of the piston and passes into a cylindrical cavity 44b. Oil pressure within the cavity 44b exerts a downward pressure on the cylindrical sleeve 42 tending to drive the lower center 37 downwardly. By reversing the flow of oil between the fittings 43 and 44, therefore, the lower center 37 can be moved upwardly and downwardly as desired.

Fine adjustment of the positioning of the lower center 37 can be accomplished by means of a hand wheel 52. The hand wheel 52 has a threaded shaft 53 connected thereto and is received within a threaded bushing 54. By rotating the wheel 52, the threaded shaft 53 moves upwardly and carries with it the carriage arm 55 which in turn is coupled to the cylinder 42. This moves the lower center 37 upwardly.

Figure 4:
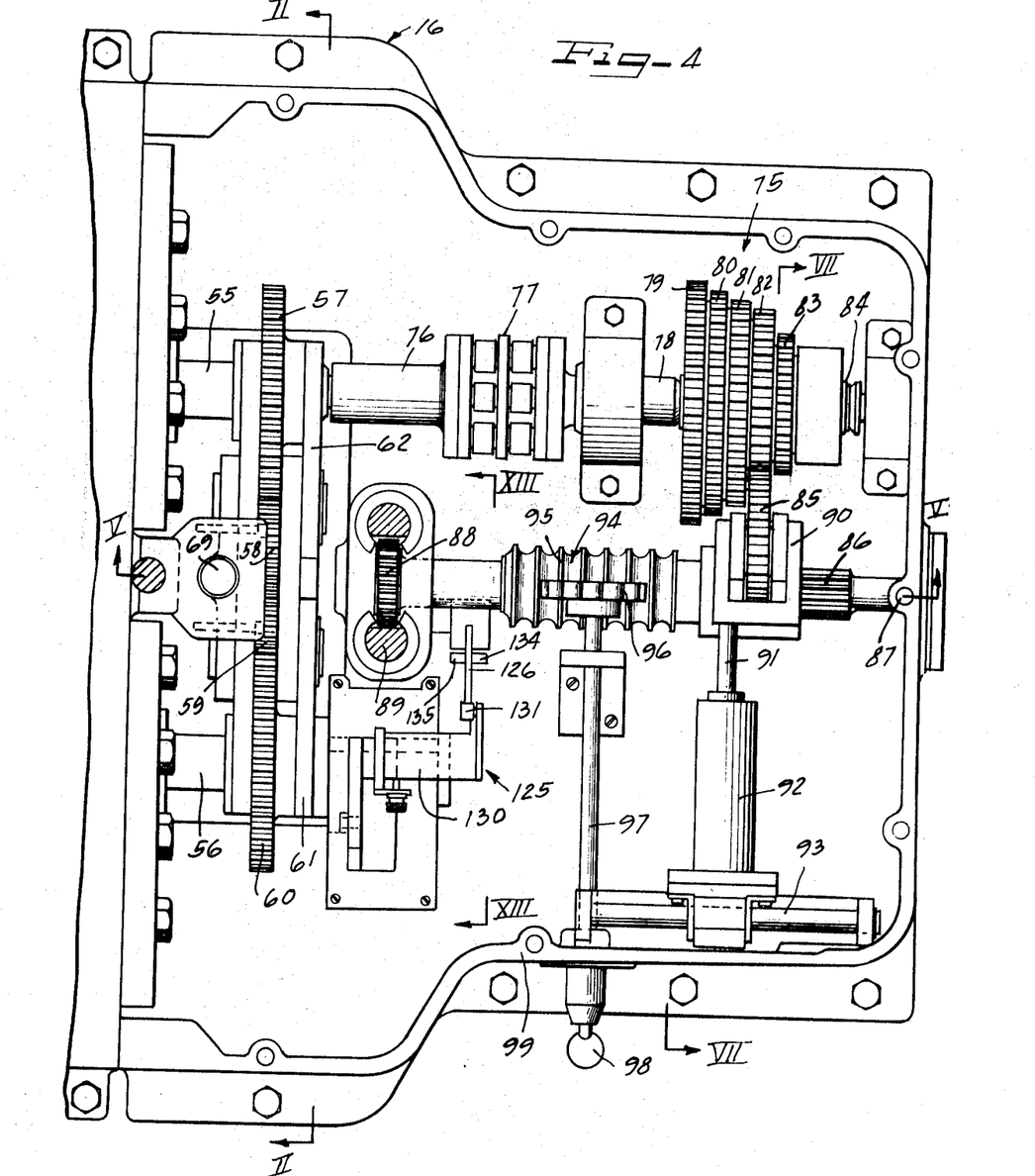
FIG. 4 is a top view of a portion of the machine shown in FIG. 1 and illustrating the transmission and the associated drive gears for the rolls.

Shafts identified by reference numerals 56 and 56a in FIG. 4 are coupled directly to the rolls. As explained in connection with FIG. 6, the shafts and hence the rolls may be moved laterally to change the spacing therebetween and thereby accommodate larger or smaller diameter rolls.

Since the movement of the shaft 56 is used to drive the shaft 56a, a gearing arrangement must be provided between the shafts which allows for the described lateral motion. Such a gearing arrangement takes the form of four gears 57, 58, 59 and 60, and a series of linkages such as the linkages 61 and 62 in FIG. 2. The linkage 62 is coupled between the gears 57 and 58 at pivot points 63 and 64, and the linkage 61 is coupled between the gears 59 and 60 at pivot points 65 and 66. A single bracket 67 supports the gears 58 and 59 and upper and lower shaft portions 68 and 69 respectively are slidably supported within brackets 70 and 71.

Figure 2:
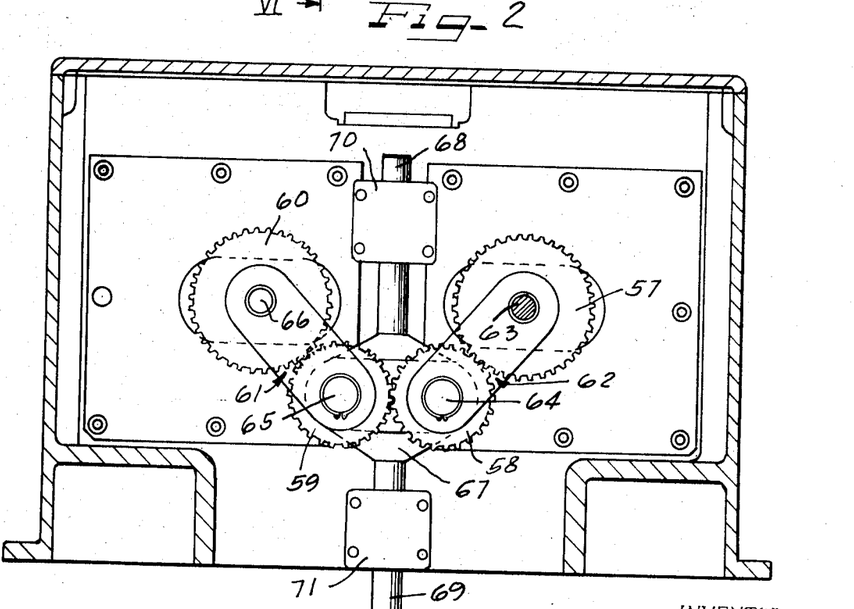
FIG. 2 is a sectional view taken along the lines II—II of FIG. 4 and shows the set of gears and linkages used to move the rolls laterally with respect to one another to accommodate different diameter rolls on the machine.

It can be seen in FIG. 2 that if the shafts 68 and 69 are moved upwardly, the gears 57 and 60 will be moved laterally apart due to the linkage arrangement, and likewise if the shafts 68 and 69 are moved downwardly, the gears 57 and 60 will be moved laterally together. In this way, the lateral movement of the rolls as described in connection with FIG. 6 can be accommodated by the gear train arrangement of FIG. 2.

The movement of the shafts 68 and 69 is accomplished by a hydraulic motor 72 shown in FIG. 3. The motor 72 drives the shaft 69 upwardly or downwardly as required through a pair of oil fittings 73 and 74. This is the principal means for moving the rolls.

The rotary movement of the roll gear 57 shown in FIG. 4 is used to drive a transmission cone of gears 75. The cone of gears 75 in turn is used to produce the linear movement of the electrode as it moves between the rolls.

The drive for the transmission cone of gears is accomplished by means of a shaft portion 76 which is coupled from the gears 57 to a parallel displacement coupling 77. A second shaft portion 78 is coupled from the coupling 77 to the cone of gears 75. The parallel displacement coupling 77 is well known in the art and allows the shaft 76 to be displaced laterally to accommodate the lateral movement of the gear 57 and of the rolls associated therewith.

The cone of gears 75 consists of gears 79, 80, 81, 82 and 83. Each of the gears 79 through 83 have a consecutively reduced diameter with the gear 83 being coupled to a bearing assembly 84.

A coupling gear 85 couples torque from the transmission cone of gears 75 to a spline shaft 86. The spline shaft 86 extends from a point 87 to a gear 88 which drives a rack gear 89. The rack gear 89 is coupled directly to the electrode and provides the linear motion for the electrode movement. In this way, the turning of the rolls is coupled through the gear 57 and the transmission 75 to the spline shaft 86 and hence to the rack 89.

The coupling gear 85 is mounted to a bracket 90 which in turn is coupled to a piston 91 of a hydraulic motor 92. The hydraulic motor 92 is coupled to a bracket 93.

Figure 5:
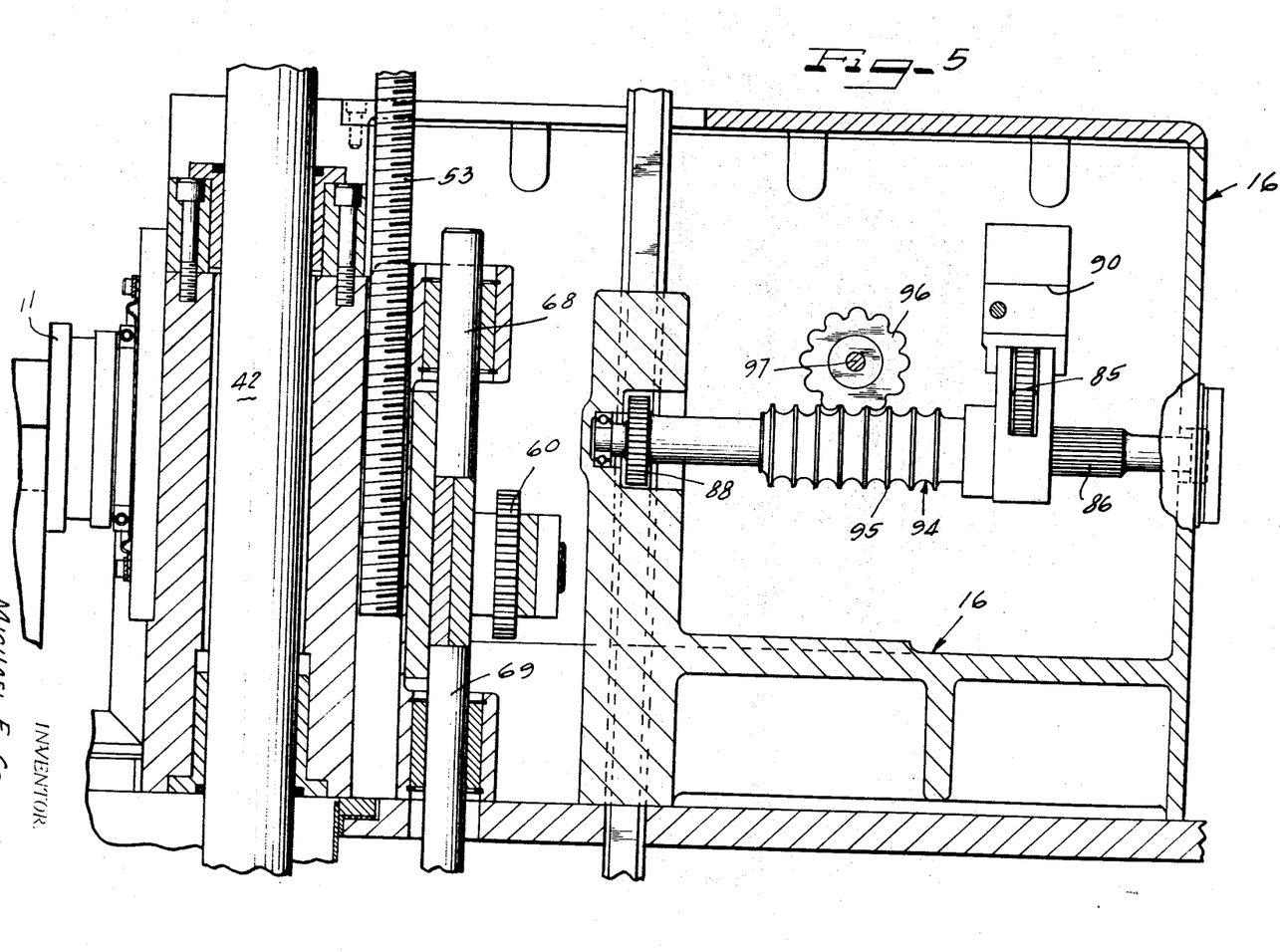
FIG. 5 is a sectional view taken along the lines V—V of FIG. 4 and showing some parts in elevation and in particular illustrating the sleeve rack gear and associated pinion for moving the coupling gear of the transmission in a longitudinal direction relative to the transmission cone of gears as shown in FIG. 4.
Figures 7, 8:
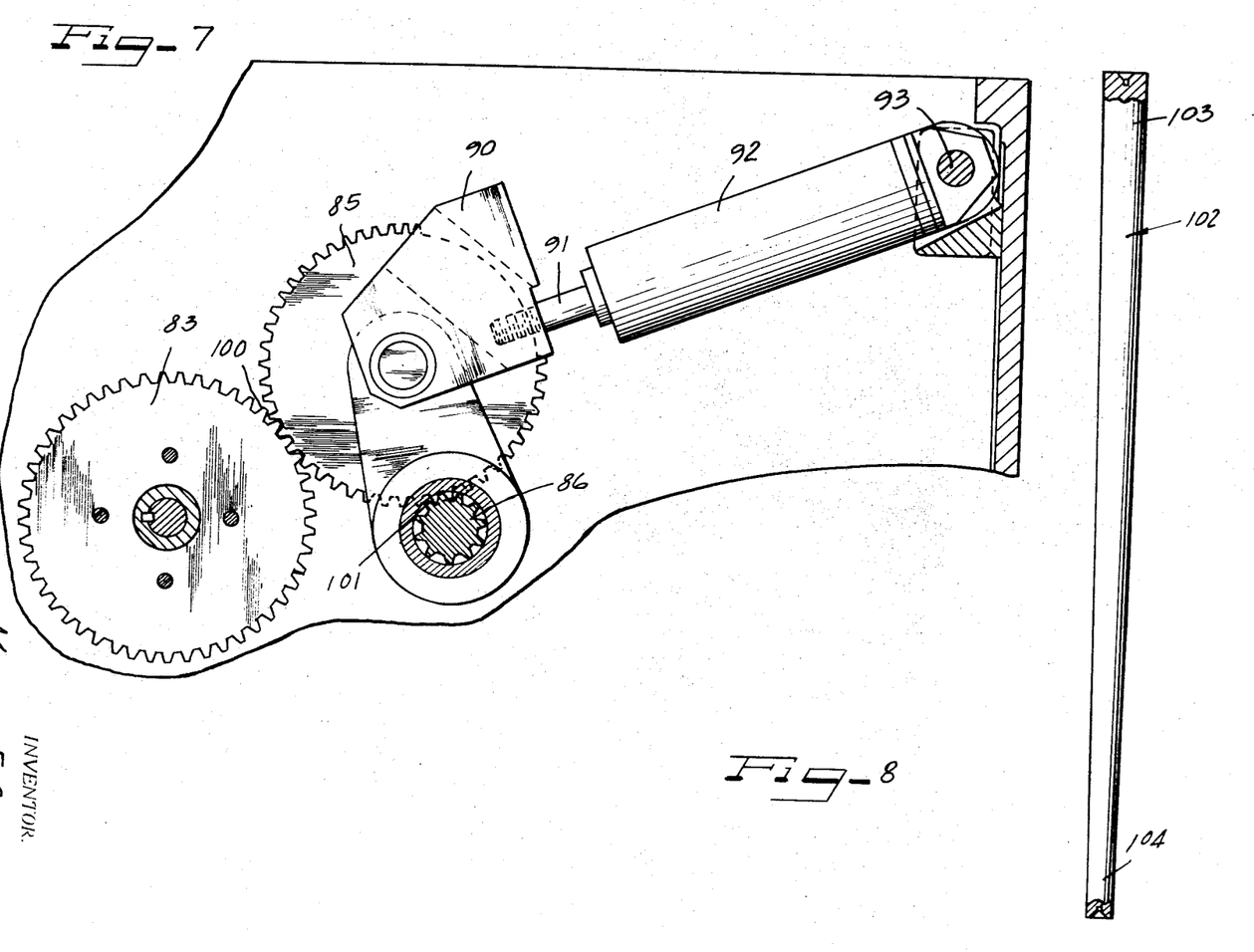
FIG. 7 is a sectional view taken along the lines VII—VII of FIG. 4 showing the hydraulic motor which is used for positioning the coupling gear into engagement with the transmission cone of gears.
FIG. 8 is an elevational view showing an electrode which may be utilized in the apparatus of the present invention.

A sleeve 94 is mounted about the spline shaft 86 and has a rack-like gear 95 formed at the outer surface thereof. A pinion 96 is meshed with the gear 95 and may be rotated by means of a shaft 97 which is coupled to a turn screw 98. The turn screw 98 is mounted within a wall 99 of the machine frame 16. In FIG. 7 the piston 92 is shown to angle from its pivot point at 93 in the direction of the transmission gear 83. The coupling gear 85 is shown meshed with the transmission gear 83 at point 100. Also, the coupling gear 85 is shown meshed with the spline shaft 86 at 101. Accordingly, as the transmission gear 83 rotates, torque is delivered to the coupling gear 85 and hence to the spline shaft 86. Torque from the spline shaft 86 is then supplied to the gear 88 and the gear rack 89 for controlling the movement of the electrode as illustrated in FIG. 3.

When it is desired to disengage the coupling gear 85 with one of the gears, 79 through 83, of the cone of gears 75, the hydraulic motor is actuated and the gear is lifted from its engagement position. Also, the turn screw 98 is rotated causing the sleeve 94 to move longitudinally along the spline shaft 86 and to carry with it the coupling gear 85 and hydraulic motor arrangement. In this way, the coupling gear may be positioned adjacent to any one of the gears of the transmission cone of gears to change the ratio between the angular speed of the gear 57 which drives the roll and the linear speed of the rack 89 which drives the electrode.

In this way, a variable speed change is accomplished between the rotary motion of the rolls and the linear motion of the electrode without the need to physically replace gears on the machine. This transmission effect is accomplished despite the need of the transmission to be driven from a rotary shaft which must move laterally. Through the use of the transmission arrangement shown in FIG. 4, the entire roll machining apparatus becomes more flexible and more effective since various diameter rolls can be machined sequentially by making only minor machine adjustments.

In FIG. 8 an electrode 102 is shown to have a tapered shape extending from a maximum diameter at a point 103 to a minimum diameter at a point 104. By passing the electrode between the rolls as the rolls rotate, the shape of the groove can be varied from a maximum to a minimum to perform the desired roll reducing technique. The electrode shown in FIG. 8 is mounted between the centers 36 and 37 shown in FIG. 3. Electrodes of this nature may be of various length and various sizes depending on the nature of the groove being formed and the diameter of the associated roll. Due to the above-described advantages of the transmission of this invention, the electrode speed and hence the electrode length may be varied as desired by making the required speed change in the transmission.

Figures 9, 10, 11, 12:
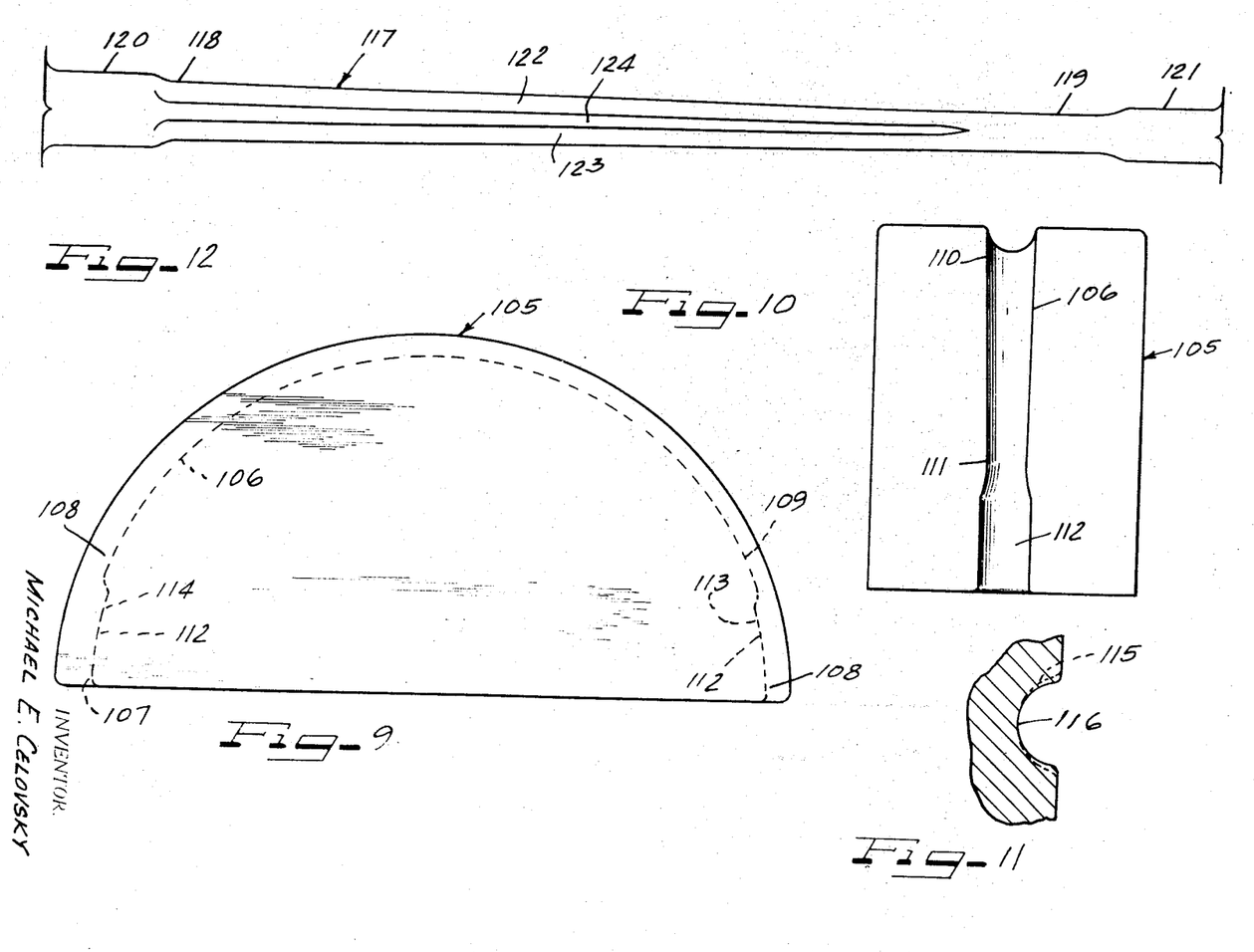
FIG. 9 is an elevational view of a roll which is formed by the method and apparatus of the present invention and showing the base of the groove which is machined in the roll by the electrode shown in FIG. 8.
FIG. 10 is an elevational view of the peripheral face of the roll shown in FIG. 9 illustrating the shape and positioning of the groove which is machined therein according to the apparatus and method of the present invention.
FIG. 11 is a sectional view of the roll shown in FIG. 9 illustrating the side relief feature of the groove which is machined therein by the apparatus of the present invention.
FIG. 12 is a layout of the groove shown in the roll of FIGS. 9 and 10 and illustrating the nature of the side relief cut which is provided by the apparatus of the present invention.

In FIG. 9, a roll 105 is shown in elevation. The roll 105 has a groove which is illustrated by a dotted line 106. The groove extends through the entire portion of the roll beginning at a point 107 and terminating at a point 108. As shown in FIG. 12, the roll is semicircular in form, and the groove tapers from a maximum diameter in the vicinity 108 to a minimum diameter in the vicinity 109. The roll may be mounted as in the case of the roll 11 shown in FIG. 3. More particularly, the roll may be mounted on the shafts 56 and 56a as shown in FIG. 4 and as further illustrated in FIG. 6.

In FIG. 10, the roll 105 is further illustrated showing the shape of the groove 106 and illustrating the tapered nature of the groove from points 110 to 111. A relief pocket 112 is shown and is identified by reference numerals 113 and 114 in FIG. 9.

FIG. 11 is a sectional view of a portion of a roll similar to the roll 105 and illustrating a side relief 115 which is formed in a groove 116. The side relief allows excess material to be relieved from the groove as pipe or related material is being rolled and reduced in diameter.

In FIG. 12, a layout 117 of a groove for a roll such as the roll 105 is illustrated. The layout 117 shows a groove being tapered from a point 118 to a reduced diameter portion at 119 with relief pockets 120 and 121 at the ends of the layout. The groove 117 has a relief portion 122 and 123 formed therein according to the present invention to allow a relief of excess material during the roll reducing process. A central area 124 illustrates the base of the groove which is not touched by the relief feature.

The side effect or side relief of the groove which is formed in the rolls being manufactured by the apparatus and method of the present invention is accomplished by a device illustrated generally by the reference numeral 125 in FIG. 4. This device is illustrated in greater detail in FIG. 13. The apparatus 125 generally provides a means for controlling the degree of penetration of an oversized electrode which is being passed between two rolls having a groove machined therein. After the main groove has been machined in the rolls, a larger electrode is inserted in the machine between the centers 36 and 37 shown in FIG. 3. This electrode then passes between the rolls in the usual manner with the degree of penetration or the depth of cut into the grooves being controlled by the apparatus 125.

Figure 13:
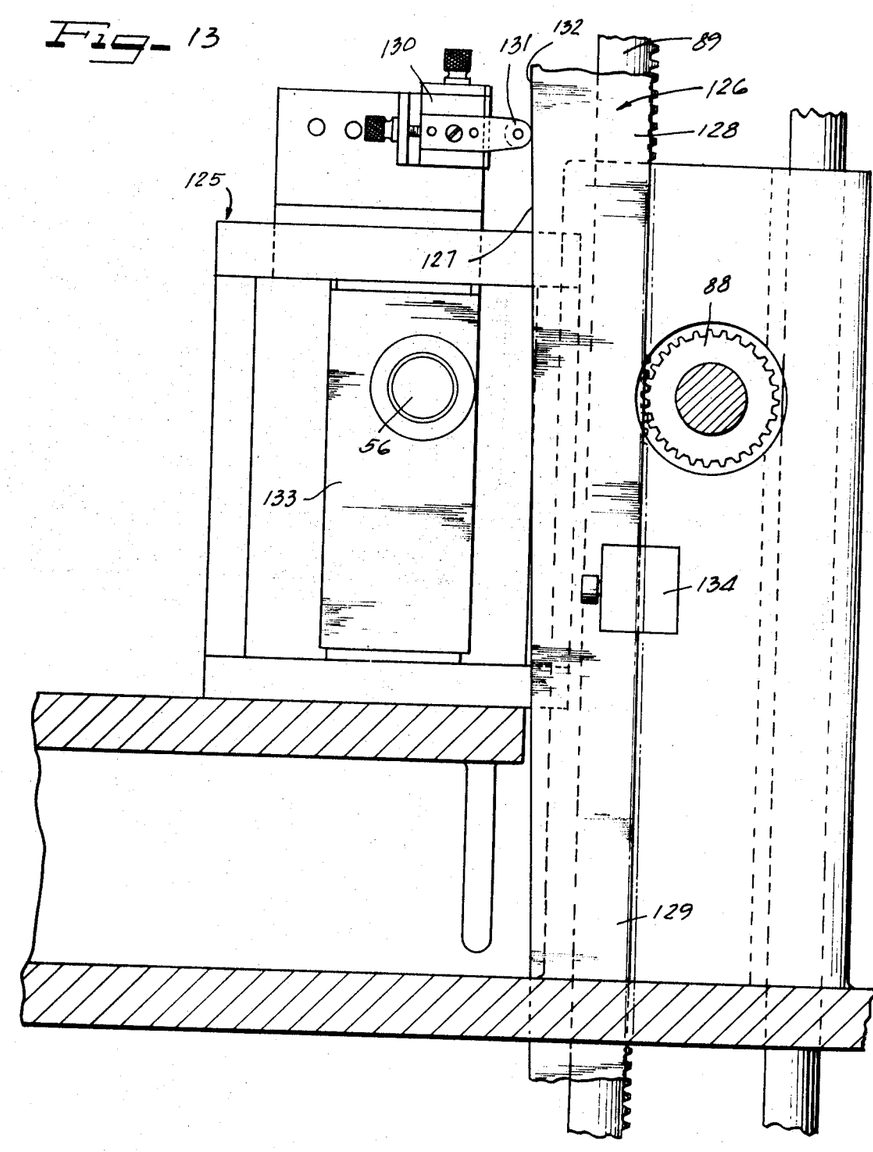
FIG. 13 is an elevational view taken along the lines XIII—XIII of FIG. 4 and showing the apparatus for forming the side relief in the grooves such as shown in FIG. 12.

A templet 126 is coupled to the rack 89 and is carried by the rack in a vertical direction either upwardly or downwardly to control operation of the apparatus 125. The templet 126 may take any configuration to produce any desired relief effect in the groove. In this case, the templet 126 has a tapered profile 127 extending from a large width at a point 128 to a narrower width at a point 129.

The templet 126 controls the penetration of the electrode into the grooves by operating a tracer valve 130. The tracer valve has a roller 131 which rides along the surface 132 of the templet and controls the hydraulic pressure passing through the tracer valve 130. This hydraulic pressure is coupled to the piston and cylinder assembly 26 and 27 shown in FIG. 6 to control the pressure on the bearing blocks such as the bearing block 21, thereby to move the shaft 56a and its associated roll into engagement with the electrode which is positioned between the rolls. Accordingly as the tapered electrode 126 moves, more or less pressure is applied to the piston 26 to move the rolls into operating engagement with the tapered electrode thereby controlling the nature of the relief effect in the grooves.

The apparatus 125 is a complete mechanical feedback system. Assume that, due to the profile of the templet 126, increased pressure is demanded at the piston 26, and the roll is moved inwardly toward the electrode. This movement must be sensed to allow the apparatus 125 to cease its demand for increased pressure when the desired degree of penetration is reached. This is accomplished by physically attaching the tracer valve 130 to the roll shaft 56a as shown in FIG. 13. Accordingly, after the roll shaft has moved into the desired engagement position with the electrode, the roller 131 has moved away from the profile of the templet, thereby decreasing the pressure supply to the piston 26. In this way, the movement of the piston 26 is precisely determined by the profile 126. In other words, the movement of the piston 26 increases until the roll shaft 56a moves the tracer valve and the roller away from the profile 132 of the templet 126 thereby closing off the flow of pressure from the tracer valve to the piston 26.

In FIG. 13, the shaft 56a is shown mounted in a block 133 which is coupled to the bearing block 21 illustrated in FIG. 6. The templet 126 in FIG. 13 is supported by a series of guides 134 and 135. The function of these guides may be more clearly seen in FIG. 4.

Accordingly, the present invention provides a method and apparatus for moving a pair of rolls with respect to one another while maintaining a common drive between the two and while maintaining a transmission coupling to the electrode drive rack and simultaneously having capability for automatically machining a side relief in the grooves.

Another advantage of the transmission arrangement shown in FIG. 4 is that through the transmission gear reduction available, a shorter electrode can be used. By means of the transmission the linear speed of the electrode can be varied at will in relation to the angular speed of the rolls thereby permitting the use of a small electrode with a high diameter to length ratio. Such an electrode can be more economical and precision produced. The method, essentially, comprises moving the shorter electrode in engagement with the rolls at a reduced linear speed.

I claim as my invention:

1. An apparatus for electric arc machining a groove in a roll comprising:

means for supporting and rotating the roll, an electrode and means for supporting the same, a speed shifting gear transmission, means coupling the output of said transmission to drive the electrode in a linear direction for machining the roll, shaft means interconnecting said roll with said transmission, and a parallel displacement coupling within said shaft means to accommodate relative movement between the roll axis and the electrode axis to permit continuous use of the gear transmission for different diameter rolls.

2. A machine in accordance with claim 1 wherein said transmission comprises a number of gears having different diameters, said gears being driven in timing with the rotation of said roll, a coupling gear and means for moving the same into engagement with any selected one of said number of gears, and means utilizing the rotation of said coupling gear to produce related linear movement of said electrode.

3. A machine in accordance with claim 2 wherein said number of gears having different diameters comprises a cone of gears.

4. A machine in accordance with claim 3 wherein means are provided to drive said cone of gears at the same speed as the speed of said roll.

5. A machine in accordance with claim 2 wherein said means for moving said coupling gear into engagement with any selected one of said number of gears comprises means for moving said coupling gear in a direction generally transverse of the axis of said number of gears, and means for moving said coupling gear in a direction generally parallel to the axis of said number of gears, whereby said coupling gear may be moved out of engagement with one of said number of gears, moved axially into alignment with a different one of said number of gears and moved transversely into meshed engagement with said different gear.

6. A machine in accordance with claim 5 wherein said means for moving said coupling gear transversely of said cone of gears comprises a hydraulic motor.

7. A machine in accordance with claim 5 wherein a splined shaft is provided to drive the electrode and be driven by said coupling gear and wherein said coupling gear and hydraulic motor are slidable along said splined shaft to engage different ones of gears of said cone of gears.

8. An apparatus for electric arc machining grooves in a pair of rolls comprising:

means for supporting and rotating the pair of rolls, an electrode and means for supporting the same, means for moving the electrode linearly in timing with the rotary movement of the rolls, gear means intercoupling the rolls to drive both rolls of said pair at the same rotary speeds, a series of speed shifting transmission gears, a parallel displacement coupling, a first shaft interconnecting one of said gear means and said parallel displacement coupling, a second shaft interconnecting said parallel displacement coupling and said series of transmission gears, a coupling gear selectably engageable with one of said series of transmission gears and being driven thereby, and means translating the rotary movement of said coupling gear into linear movement of said electrode.

9. A machine in accordance with claim 8 wherein said means for translating the rotary movement of said coupling gear into linear movement of said electrode comprises drive gear means rotated by said coupling gear, a gear rack supporting said electrode, and said gear rack being meshed with said drive gear means.

10. A machine in accordance with claim 9 wherein said gear means comprises a splined shaft and wherein positioning means are provided to move said coupling gear to different axial positions along said splined shaft to engage different ones of said series of transmission gears.

11. A machine in accordance with claim 10 wherein said positioning means comprises a rack-like gear mounted substantially parallel to the axis of said splined shaft and connected to said coupling gear and an adjustment gear meshed with said rack-like gear and means for rotating the adjustment gear to drive said rack-like gear and said coupling gear longitudinally of said splined shaft.

12. A machine in accordance with claim 11 wherein said rack-like gear comprises a sleeve fitted about said splined shaft and wherein the outer face of said sleeve has a rack gear surface for being meshed with said adjustment gear.

13. An apparatus for electric arc machining grooves in a pair of rolls comprising:

means for supporting and rotating the pair of rolls, an electrode and means for supporting the same, a speed shifting gear transmission, means coupling the output of said transmission to drive the electrode in a linear direction for machining the rolls, shaft means interconnecting one of said roll gear means with said transmission, and a parallel displacement coupling within said shaft means to accommodate various spacings of the roll axes while permitting continuous use of said gear transmission for different diameter gears.

* * * * *